E. D. CARTER.
AUTOMATIC WEIGHING SCALE.
APPLICATION FILED JULY 29, 1911.

1,011,575.

Patented Dec. 12, 1911.

WITNESSES:

Edward D. Carter.
INVENTOR

ATTORNEY

E. D. CARTER.
AUTOMATIC WEIGHING SCALE.
APPLICATION FILED JULY 29, 1911.

1,011,575.

Patented Dec. 12, 1911.

Edward D. Carter.
INVENTOR

WITNESSES:

E. D. CARTER.
AUTOMATIC WEIGHING SCALE.
APPLICATION FILED JULY 29, 1911.

1,011,575.

Patented Dec. 12, 1911.
3 SHEETS—SHEET 3.

WITNESSES:
J. J. Murray
R. Bruckner.

Edward D. Carter.
INVENTOR

BY John M. Spellman.
ATTORNEY

UNITED STATES PATENT OFFICE.

EDWARD D. CARTER, OF DALLAS, TEXAS.

AUTOMATIC WEIGHING-SCALE.

1,011,575.	Specification of Letters Patent.	Patented Dec. 12, 1911.

Application filed July 29, 1911. Serial No. 641,336.

*To all whom it may concern:*

Be it known that I, EDWARD D. CARTER, a citizen of the United States, residing at Dallas, in the county of Dallas and State of Texas, have invented certain new and useful Improvements in Automatic Weighing-Scales, of which the following is a specification.

My invention relates to new and useful improvements in automatic weighing scales, and relates more particularly to certain improvements upon the construction covered by Letters Patent Number 837,794, which were issued to the applicant December 4, 1906.

The object of the invention is to provide a weighing scale, entirely automatic in operation, which will be adapted for continuously weighing material in bulk, such as cotton seed, wheat, meal, et cetera, said material being supplied to the machine in a continuous flow, and being discharged therefrom periodically in quantities having a known weight.

Another object of the invention is to provide a scale of this character in which the discharge of material weighed, or the quantity which is periodically discharged, may be readily varied without adding weights to the scale or removing them therefrom.

A further object of the invention is to provide an improved form of oscillatory receiver, having a main compartment to receive the material weighed and a small auxiliary compartment which receives the material while the larger compartment is discharging, and later discharges into the larger compartment while the same is filling.

The invention also has for its object an improvement in the construction of the mechanism for automatically operating the gates or doors, which control the discharge of material from the compartments of the receiver, including means for automatically closing and locking said doors, and opening the same at the proper time.

A still further object of the invention lies in the provision of a means for greatly reducing the flow of material into the receiver just before the main compartment thereof has received an amount of material equal to the unit of weight employed, thus avoiding the possibility of said compartment receiving an excess of material before the automatic mechanism can take effect.

Still another object is to provide a suitable discharge hopper for the weighing scale, to which hopper a bag or sack may be quickly applied and securely held while being filled with the material weighed, the construction being such that said sacks may be also quickly removed after they have been filled.

Finally the object of the invention is to provide a device of the character described that will be strong, durable, simple and efficient and comparatively easy to construct, and also one the various parts of which will not be likely to get out of working order.

With these and various other objects in view, my invention has relation to certain novel features of the construction and operation, an example of which is described in the following specification and illustrated in the accompanying drawing, wherein:

Fig. 3 is a front view of the weighing scale.

Referring now more particularly to the drawing, wherein like numerals of reference designate corresponding parts in all the figures, the numeral 1 denotes the four upright members of the open frame-work, in which the mechanism of the weighing scale is supported, and 2 denotes the horizontal members of the frame-work, positioned at each side thereof one at the top and one in the lower portion. The members 1 and 2 will preferably have the form of angle bars and the structure which they form will hereinafter be designated as the supporting frame. A pivoted frame, consisting of two lateral bars 3, approximately horizontal and positioned one at each side of the supporting frame, and three transverse rods 4, rigidly connecting the bars 3, is supported upon the lower portion of the supporting frame. The pivotal supporting means consists in a pair of knife edged bearings 5 which are mounted upon the two front members 1 of the supporting frame in horizontal alinement. A notch 6 is provided upon the under side of each bar 3 at the forward extremity thereof to receive the knife edged bearings, and an angle bracket 7 is mounted just above the bars 3 upon each of the front members 1 of the supporting frame. The bars 3 are thus able to undergo the slight pivotal motion necessary to the invention, but are prevented by the brackets 7 from undergoing sufficient upward displacement to permit of their being dislodged from their pivotal supports. The rear extremities of the bars 3, which project slightly beyond the supporting frame of the machine, are provided with hooks 8. Each of these hooks receives a chain link 9 which is loosely connected to the lower end of a vertical rod 10 carrying a hook 11 upon its upper extremity. Each hook 11 engages a U-shaped fastening 12, said fastening being suspended from the rear end of a pair of beams 13, which are pivotally mounted upon the rear pair of uprights 1 and are horizontally positioned at each side of the supporting frame. The rear ends of the bars 13 are received between the arms of the fastenings 12, which arms are provided with apertures receiving knife edged pins 14 projecting from said bars. The pivotal means, by which the bars 13 are supported, consists of knife edged pins 15 projecting inwardly from each bar and supported by the lower edges of circular apertures 16 provided in plates 17 rigidly secured to the rear uprights 1. A metal bar 18, which connects the beams 13 adjacent to their rear end, serves also to give weight to the rear end of said bars to counterbalance a pair of sliding weights 19, one of which is adjustable upon each beam 13, and which are adapted to be held in any adjustment by set-screws 20. The forward extremities of the beams 13 project slightly beyond the supporting frame, and are received by keepers 21, one of which is mounted upon each forward upright 1, serving to restrict the angular displacement of the beams about their pivotal support. It is apparent that when any weight supported by the bars 3 becomes sufficiently great to counterbalance the weights 19, the bars 3 and the beams 13 will both undergo angular displacement about their pivotal supports, the extent of this displacement being limited by the keepers 21. By adjusting the position of the weights 19 upon their respective beams, the amount of weight which must act upon the bars 3 to produce a displacement thereof may be varied.

Upon the bars 3 is pivotally supported an oscillatory receiver 22, the supporting means consisting in a rock-shaft 23 rigidly secured to the under side of the receiver by straps 24, and having its extremity journaled in bearings 25, one of which is centrally mounted upon each bar 3. The receiver 22 occupies almost the entire upper portion of the supporting frame, and is pivoted somewhat to the rear of its center, so that the greater weight lies in front of the pivotal point, giving the receiver a tendency to swing forward. The receiver will preferably be constructed of sheet metal, although any other suitable material might be employed. The main compartment of the receiver is denoted by the numeral 26 and the auxiliary compartment by the numeral 27, the latter being located in the upper rear portion of the receiver and extending across the entire width thereof. The compartment 26 has the rear portion of its bottom inclined, as indicated at 28 in order to facilitate the discharge of material from said compartment. The top of the receiver is open, and its two compartments are adapted to be alternately brought beneath a spout, which will presently be described for discharging the material to be weighed into the scales. When the receiver is tilted to one side, one of the compartments is in position to receive the material, and when the receiver is tilted in the opposite direction, the other compartment is brought into position to receive a charge. The main compartment will remain beneath the spout for a considerably longer time than the compartment 27, since the latter receives the material only during the comparatively short time, during which the large compartment is discharging.

Figure 1:
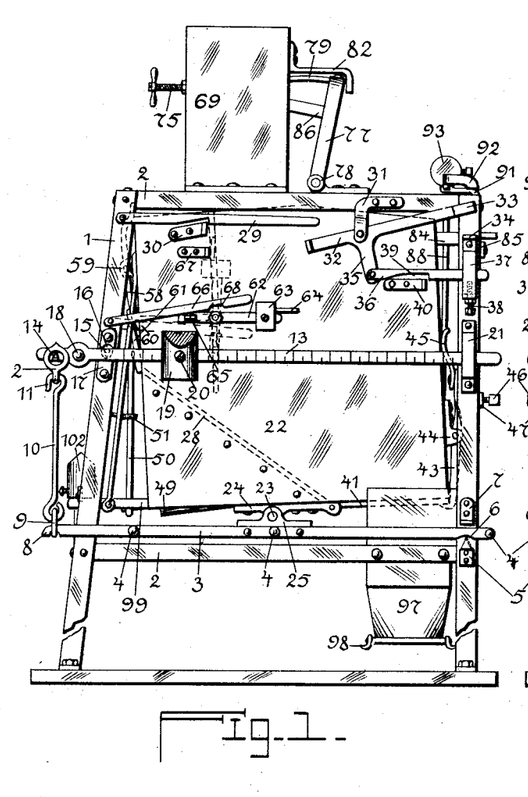
Figure 1 is a side elevation of a weighing scale constructed in accordance with the herein described invention.

As the material gradually accumulates in the large compartment while the same is being filled, there is a constantly increasing tendency for the receiver to swing forward owing to the excess of weight in front of its line of pivotal support. In order to prevent such a motion, a locking means is provided, consisting of a lever 29, (see Fig. 1), pivoted near the upper end of one of the rear uprights 1, and extending forwardly adjacent to the receiver, and an angle bracket 30 mounted upon the receiver and engaging in a slot upon the lower edge of the lever 29. This locking means is automatically released when the compartment 26 has received the proper weight of material by a mechanism which will now be described.

Figure 2:
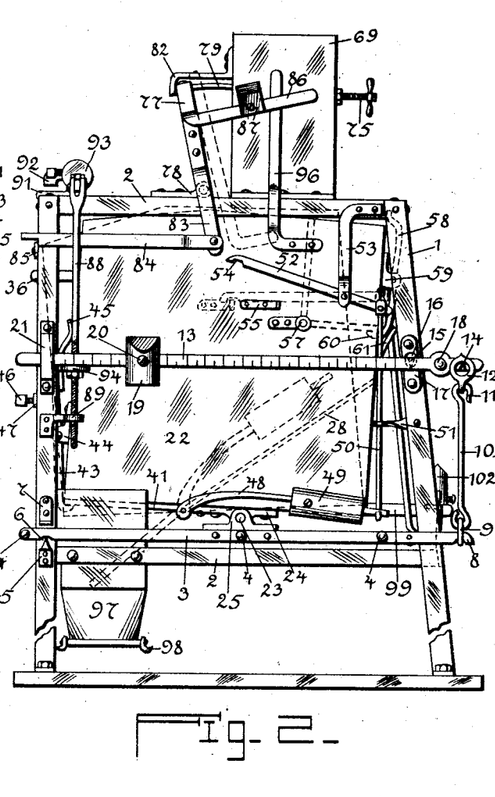
Fig. 2 is an elevation showing the other side of the machine.

A bracket 31 of bell-crank shape is mounted upon the bar 2 at the top of the framework adjacent to the extremity of the lever 29, and a lever 32 is pivoted upon the downwardly extending arm of the bracket. The forward extremity of the lever 32 carries a weight 33, thus giving this extremity of the lever a tendency to undergo a downward motion, which motion is limited by an angle bracket 34 carried by one of the rear uprights 1. The rear end of the lever 32 extends beneath the lever 29, and will produce an angular displacement of said lever sufficient to detach the same from the bracket 30, when the lever 32 is swung sufficiently to bring the weight 33 into contact with the bracket 34. An arm 35 extends downwardly from the lever 32 adjacent to the pivotal point thereof, and a forwardly extending bar 36 is pivotally attached to the extremity of the arm 35. The forward end of the bar 36 is received by a slotted keeper 37, mounted upon the forward upright 1 beneath the bracket 34, and an adjusting screw 38 passing upward through the bottom of the keeper supports the extremity of said arm, and permits a slight vertical adjustment thereof. The bar 36 is provided with a notch 39 upon its lower edge, which notch is adapted to engage an angle bracket 40 secured to the side of the receiver. When the notch of the bar 36 is thus engaged, rearward motion of the bar is prevented, and the lever 32 is made to assume the position shown in the drawing with its forward end slightly raised above the bracket 34, and its rear end just beneath the lever 29. When the compartment 26 has received the necessary weight of material to counter-balance the weights 19, a slight downward displacement of the receiver will take place, the bars 3 and the beams 13 being swung at the same time through a slight angle about their pivotal support. This downward movement of the receiver is sufficient to withdraw the bracket 40 from the notch 39 of the bar 36. The weight 33 will then be permitted to fall, and swing the lever 32 through a sufficient angle to bring the rear end thereof into contact with the lever 29, raising the latter lever sufficiently to release it from the bracket 30. Under the impulse given by the weight of material in the compartment 26, the receiver will immediately swing forward, assuming the position shown in dotted lines in Fig. 2, the large compartment being ready to discharge and the small compartment in a position to receive material.

A description will now be given of the automatic mechanism by which the door of the large compartment is immediately opened when said compartment is in the proper position to discharge its contents, and also of the means provided for closing said door when the compartment is empty, preventing any oscillation of the receiver until said large compartment is completely emptied. The compartment 26 is provided with a door 41 in its bottom hinged upon a pintle 42, and extending the full width of the compartment between the inclined portion 28 and the front of the receiver. This door is held closed during the discharge of material into the compartment by a latch consisting of an upright rod 43 pivoted near its middle in a bracket 44 upon the front of the receiver, and having a hook on its lower end adapted to pass under the door when the same is closed, holding it securely in place. A curved spring 45, secured to the upper end of the rod 43, bears upon the front of the receiver tending to hold the lower end of the rod 30 in place beneath the door. When the receiver, after having undergone a downward displacement in the manner previously described, is tilted forwardly, the rod 43 will encounter the end of a screw 46 carried by a horizontal bar 47 mounted upon the front of the supporting frame. Owing to the weight of the receiver and its contents acting at the point of contact between the screw 46 and the rod 43, said bar will undergo a slight pivotal motion, the spring 45 being distorted and the lower end of the rod being swung out sufficiently to release the door 41. This door will immediately swing open under the weight of the material in the compartment 26, and will remain open as long as the material is being discharged from said compartment. In order that the door 41 may be automatically closed after the compartment 26 has been emptied, a rod 48 (see Fig. 2) is rigidly mounted upon one extremity of the pintle 42, upon which pintle the door is rigidly mounted. This rod, which extends rearwardly in an approximately horizontal direction when the door is closed, carries an adjustable weight 49 sufficient to counterbalance the door, and to close the same when the pressure exerted by the discharging material ceases.

When the door 41 is closed, the rear end of the rod 48 rests in a hook pivoted to the lower extremity of a vertical rod 50, which rod is adapted to undergo a slight vertical motion and is guided during said motion by a bracket 51 attached to the rear upright 1, which is adjacent to said rod. The upper extremity of the rod 50 has pivotal connection with the rear end of a lever 52 pivotally supported at a point adjacent to said end by a bracket 53 depending from the upper cross-bar 2. As long as the door 41 remains closed, the rod 48 will continue to exert a downward pressure upon the lower end of the rod 50, thus causing the lever 52 to assume the position shown in full lines in Fig. 2. After the receiver has undergone a forward oscillation, however, and the door 41 is opened, causing the rod 48 to assume the position shown in dotted lines in Fig. 2, the rod 50 will undergo an upward displacement due to the weight of that portion of the lever 52 in front of its pivotal support. The lever 52 is provided with a notch or groove 54 upon the under edge of its front extremity, and when said extremity descends this notch engages an angle bracket 55, mounted upon the side of the receiver. This engagement is maintained as long as the compartment 26 continues to discharge and the door 41 remains open, thus preventing any rearward oscillation of the receiver. When the compartment 26 is empty, relieving the door 41 of the pressure of the discharging material, the weighted rod 48 will fall, and its extremity will engage the hooked lower end of the vertical rod 50, producing a downward displacement of said rod, and thus disengaging the parts 52 and 55. The receiver will then be free to oscillate and, owing to the weight of the material which has accumulated in the auxiliary compartment 27, the receiver will immediately tilt rearwardly, bringing the main compartment thereof again into position to receive a charge.

Figure 4:
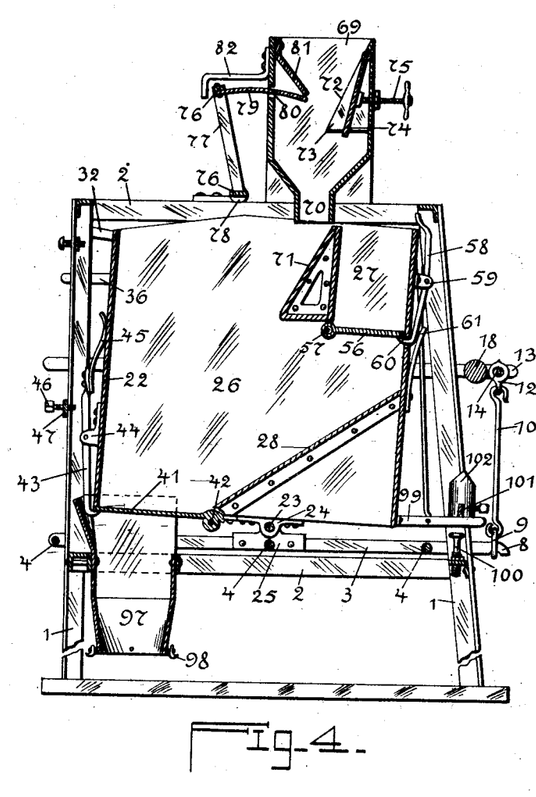
Fig. 4 is a sectional elevation, the section being taken upon the line $x$—$x$ of Fig. 3.
Figure 5:
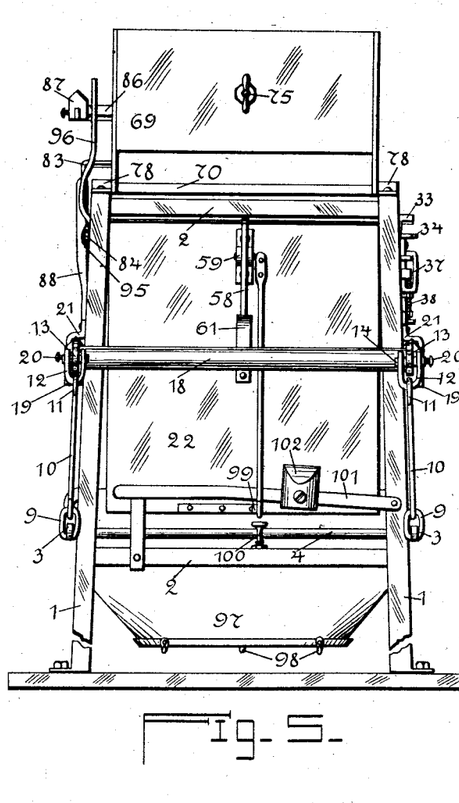
Fig. 5 is a rear view of the device.
Figure 6:
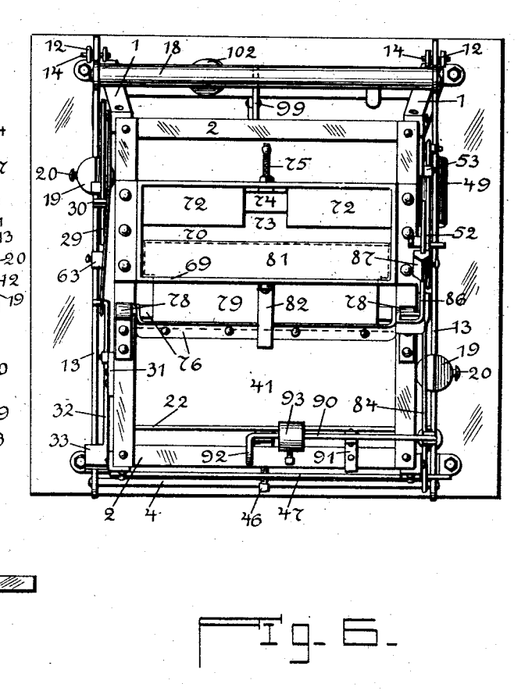
Fig. 6 is a top view of the same.

The bottom of the compartment 27 is formed by a door 56, rigidly mounted upon a pintle 57, which is pivotally supported in the side walls of the receiver. A mechanism is provided by which this door is held closed while the compartment is being filled, the mechanism being such that the door is automatically released immediately after the receiver has undergone a rearward oscillation. This mechanism consists of an upright rod 58, pivotally supported near its middle by a bracket 59 mounted upon the back of the receiver. The lower extremity of the rod 58 is turned inwardly as indicated at 60, passing through an aperture in the rear wall of the receiver and extending a short distance beneath the door 56 when the latter is closed. A spring 61 is vertically mounted upon the receiver beneath the rod 58, the lower end of said spring being fixed and its upper end bearing upon the lower extremity of the rod 58, tending to hold said extremity constantly pressed inward, as is shown in Fig. 4. After the main compartment 26 has been emptied and the receiver undergoes a rearward oscillation due to the weight of the contents of the compartment 27, the upper extremity of the rod 58 encounters the upper cross-bar 2 at the rear of the supporting frame. This produces a slight angular displacement of the rod 58 about its pivotal support, causing the lower end thereof to be displaced outwardly distorting the spring 61 and releasing the door 56. The weight of material resting upon this door will cause it to immediately open permitting the contents of the small compartment to escape into the large compartment.

A device will now be described by which the door 56 is held open while its contents are discharging, and by which it is closed as soon as its contents have escaped. Upon one end of the pintle 57 is rigidly mounted a bar 62 near its middle portion. This bar is parallel with the lateral edges of the door, and is, therefore, horizontal when the door is in its closed position. The forward end of the bar 62 carries an adjustable weight 63 and a pin 64 projects rigidly from said weight some distance beyond the end of the bar. The rear end of the bar 62 is given a right angle turn extending outwardly for a short distance, as indicated at 65. Upon the portion 65 of the bar 62 there rests the forward portion of a lever 66, approximately horizontal and pivoted at its rear end upon one of the uprights 1. When the locking mechanism of the door 56 is released permitting said door to open under pressure of the we nt resting upon it, the bar 62 swings through an arc slightly exceeding a right angle, and the pin 64 rests against an angle bar 67, mounted upon the side of the receiver. (See positions of parts illustrated in dotted lines in Fig. 1.) This angular motion of the bar 62 brings the portion 65 thereof to a point beneath the pintle 57, thus permitting the lever 66 to swing slightly downward. This lever is provided adjacent to its extremity with a notch 68 upon its under edge, which notch engages the portion 65 of the bar 62 when the latter is in the upright position illustrated in dotted lines in Fig. 1. Owing to this engagement between the parts 66 and 65, the door of the small compartment will be held open until the receiver undergoes a forward oscillation. As the receiver moves forward, the resistance offered by the lever 66 to the motion of the lower end of the rod 62 will cause the upper end of said rod to swing forward until it becomes overbalanced by the weight 63 and drops to the position shown in full lines in Fig. 1 closing the door of the compartment.

Upon the top of the supporting frame slightly to the rear of the center thereof is mounted a rectangular chute 69, having a width equal to that of the receiver, and having its lower extremity reduced forming an elongated discharge spout 70 positioned closely adjacent to the top of the receiver. The spout 70 is so positioned that the partition separating the two compartments of the receiver will be centrally beneath said spout when the receiver has undergone a half oscillation in either direction. An inclined partition extends downwardly for a short distance from the upper edge of said partition in order to deflect the material weighed forwardly as it is discharged into the larger compartment. An inclined partition 72 also extends downwardly from the upper edge of the rear wall of the spout for a purpose which will presently be made clear. A gap, denoted by the numeral 73, is provided at the middle of the partition 72, and is partially closed by a door 74, having a hinged support near the upper edge of the partition 72 and extending the full width of the gap 73. This door is mounted at a slight inclination, the extent of such inclination being controlled by an adjusting screw 75 passing through the rear wall of the spout. A rectangular frame consisting of a pair of horizontal members 76, and a pair of lateral upright members 77 is pivotally mounted on top of the supporting frame in front of the chute. The extremities of the lower member 76 are projected slightly beyond the frame forming journals, which are received in bearings 78, one of which bearings rests upon each of the upper side bars 2. A curved plate 79, secured to the upper member 76 of said pivoted frame, projects through a slot 80 in the front wall of the chute, and by subjecting said frame to slight pivotal displacement, the free edge of the plate 79 may be brought into contact with the inclined partition 72, thus entirely closing the passage through the chute with the exception of the small opening formed by the gap 73. An inclined plate 81 is mounted within the chute upon the front wall thereof, and extends from the upper edge of said wall to a point closely adjacent to the plate 79. This plate prevents any of the material being weighed from escaping through the slot 80, and also decreases the amount of weight which acts upon the plate 79 when the same is within the chute, avoiding the possibility of the plate being bent by such weight, and also decreasing the friction occasioned when the plate is withdrawn. Upon the outer surface of the front wall of the chute is mounted a bracket 82 centrally above the frame formed by the parts 76 and 77, the forward extremity of said bracket being turned down, and forming a stop to limit the outward swinging motion of said frame. The purpose of the mechanism just described, consisting of the curved plate 79 supported by a pivoted frame, is to decrease the flow of material into the large compartment 26 when the contents of said compartment have almost reached the weight constituting a charge, and necessary to produce an oscillation. This reduction of the flow of material is accomplished by causing the plate 79 to be swung into the chute, thus closing the greater portion of the passage through the chute and only permitting a small flow of grain through the gap 73. By thus reducing the inflow of material just before the receiver oscillates, there is prevented any possibility of the compartment 26 being over-charged before the automatic mechanism can take effect.

The mechanism will now be described by which the frame supporting the plate 79 is swung in and out at the proper time. A bar 83 has one of its extremities rigidly secured to one of the members 77 of the pivoted frame, (see Fig. 2), and after extending outwardly a sufficient distance to clear the supporting frame, said bar extends downwardly some distance. The lower extremity of said bar has pivotal connection with the rear end of a horizontal bar 84, the forward end of which rests upon a small latch 85 projecting laterally from one of the front uprights 1. The forward end of the bar 84 is provided upon its under edge with an off-set which may be made to engage the latch 85, and when such engagement exists, the pivoted frame carrying the plate 79 is swung outward, leaving the passage through the chute unobstructed. A bar 86 has one extremity attached to the pivoted frame adjacent to the extremity of the bar 83. Said bar 86 extends outwardly a short distance and then projects in a rearward direction, a weight 87 being adjustably mounted on the portion of said bar which projects rearwardly. The weight 87 serves to counterbalance the pivoted frame and the plate 79, and produces a rearward angular displacement of said parts when the bar 84 is released from engagement with the latch 85. A vertical rod 88, adapted to undergo a slight vertical displacement, is mounted adjacent to the forward extremity of the bar 84, the lower end of said rod being slidably mounted in a bracket 89 carried by one of the forward uprights 1, and the upper extremity of said rod being pivotally attached to one extremity of a lever 90 parallel with the upper front bar 2 of the supporting frame, upon which it is pivotally supported near its middle in a bracket 91. The other extremity of the lever 90 is bent forwardly and downwardly forming a stop 92 which limits the angular displacement to which the lever 90 may be subjected. A weight 93 is adjustably mounted upon the lever 90 adjacent to the stop 92, tending to produce a downward displacement of that end of the lever, and an upward displacement of the other extremity to which the rod 88 is secured. The lower extremity of the rod 88 is threaded and carries a nut 94. The forward extremity of one of the beams 13 normally bears upon the nut 94, holding the rod 88 down against the action of the weight 93, so that the stop 92 will be slightly raised above the top of the supporting frame. When the parts are in the position described and the off-set extremity of the bar 84 is engaging the latch 85, an off-set 95 in the rod 88 will be positioned directly below the bar 84. In order to explain the operation of this mechanism it will now be assumed that the large compartment has just received its full charge, and owing to the weight thereof, is undergoing a slight downward displacement in the manner previously described. This displacement of the receiver will result in a slight pivotal motion of the beams 13, which will raise the forward extremities of said beams and thus relieve the nuts 94 of the downward pressure which said beams exerts upon them. Under the action of the weight 93, the rod 88 will immediately undergo a slight vertical displacement, and, since the bar 84 is just above the off-set 95 in the rod 88, said bar 84 will receive a slight angular displacement when the rod 88 moves upward. This will release the off-set extremity of the bar 84 from the latch 85, and will permit the curved plate 79 to swing inward due to the weight 87 acting upon the pivoted frame which supports said curved plate. It will be apparent from the description just given that the curved plate 79 is swung inward closing the passage of the chute as soon as the receiver begins to gradually descend, indicating that its contents have almost reached the desired weight. The plate 79 will obstruct the chute only during the short interval of time required for the receiver to descend sufficiently to release it from its locking mechanism and to pass through the greater part of its forward oscillation. During the latter part of this oscillation, a vertical bar 96, having its lower end rigidly mounted upon the side of the receiver, will encounter the outwardly projecting portion of the bar 86, thus swinging the pivoted frame, formed by the parts 76 and 77, outward against the bracket 82, and bringing the bar 84 into a position to again engage the latch 85. During the rearward oscillation of the receiver, the mechanism controlling said pivoted frame is unaffected, and the chute 69 remains unobstructed while the auxiliary compartment is being filled.

A description will now be given of the chute to receive the material emptied from the compartment 26, and is adapted to discharge said material into suitable sacks or other receptacles which can be easily handled. This chute is supported in the lower front portion of the supporting frame, and is rigidly attached to the lower bars 2 at the front and sides of said frame. The lower portion of the chute is gradually reduced in area, terminating in an outlet 97 of oval shape, which is provided with a plurality of hooks 98 about its edge, adapted to hold a sack in place beneath said outlet. The upper portion of the rear wall of the chute is cut away, permitting the receiver to project into the upper portion of the chute, and allowing the door 41 freedom to swing open, so that the contents of the compartment 26 will be discharged into the chute. A bar 99 projects rearwardly from the back wall of the receiver at the bottom thereof, which bar is adapted to contact with the head of a bolt 100, vertically mounted in the lower rear bar 2, and acting as a stop to limit the rearward oscillation of the receiver. Upon one of the rear uprights 1 is pivoted a lever 101, the free extremity of which rests upon the bar 99. The lever 101 carries an adjustable weight 102, which causes said lever to exert a downward pressure upon the bar 99, thus causing the receiver to quickly return to its rearmost position after it has been released from the locking device by which it is held in its forward position when the main compartment is discharging.

A brief description will now be given relating entirely to the automatic operation of the weighing scale. The machine will be set up beneath some large receptacle in which is stored the material to be weighed, the chute 69 being in communication with said receptacle. A rotating agitator of any well known construction may be mounted in the chute to keep the material flowing freely, preventing it from becoming packed. When the weight of the material in the large compartment is sufficient to counter balance the weight 19, the receiver will undergo a slight downward displacement, causing the bars 3 to swing downward about their pivotal support, and the beams 13 to swing upward. The beams 13 are graduated in units, indicating pounds or some other suitable unit of weight, and by properly adjusting said weights, the charge which accumulates in the large compartment may be varied within any reasonable limit. The adjustment of the two weights will preferably be such that one of them will serve to counter balance the weight of the receiver, and the other will counter balance the weight of material which accumulates in the large compartment. Just before the contents of said compartment reach the necessary weight to produce a complete downward displacement, the curved plate 79 will be swung into the chute closing the entire passage thereto with the exception of the gap 73, which gap may be adjusted in area by means of the set-screw 75. The downward displacement of the receiver releases a locking mechanism by which it is held tilted rearwardly while the large compartment is being filled. The weight of material carried by the large compartment and resting mainly in front of the pivotal supports, will cause the receiver to instantly tilt forward when released. Upon reaching its forward position, the door of the large compartment will be automatically opened, allowing the contents to discharge, and the motion of the door in swinging open will operate a locking mechanism which will prevent the receiver from tilting rearwardly until it has been completely emptied. The receiver in tilting forwardly acts upon the pivoted frame supporting the curved plate 79, causing said frame to oscillate rearwardly leaving the passage of the chute unobstructed. While the material is being discharged from the large compartment into the lower chute 97, the material is being discharged from the upper chute 69 into the smaller compartment. After the large compartment has been emptied the door thereof automatically closes, and the door in closing releases the locking mechanism by which the receiver is held in its forward position. The weight of material in the small compartment, acting in conjunction with the weight 102 bearing down upon the rear extremity of the receiver, causes the receiver to immediately tilt rearwardly when released from the locking mechanism. Upon reaching its rear position, the door of the small compartment will be automatically opened, permitting the contents thereof to discharge into the large compartment at the same time that the last named compartment is receiving a discharge from the chute 69. The door of the small compartment is automatically held open until the receiver again receives a forward oscillation, thus preventing any material from remaining in the small compartment to prevent the machine from weighing accurately.

The above described automatic weighing scale is adapted to handle bulk material with both speed and accuracy, and the various moving parts are so mounted as to produce a minimum friction. An advantageous feature of the machine lies in the fact that all the weights which are employed as counter balances may be adjusted, so that they will exert a force sufficient to produce the proper work without any excess weight. The invention is presented as including all such changes and modifications as may be included within the scope of the following claims.

What I claim is:

1. In an automatic weighing scale, the combination of an upper and a lower frame, pivotally supported at opposite ends, a swinging connection between the free end of the lower frame and pivoted end of the upper frame, an oscillatory receiver pivotally mounted upon the lower frame, its pivotal axis being parallel with the pivotal axes of the two frames, and nearer to the rear wall than to the front one of the receiver, said receiver being provided with a compartment in its upper portion adjacent to the rear wall, a swinging door in the bottom of said compartment, a swinging door in the bottom of the receiver, a separate locking means for each said doors, said means being such that the receiver door will be unlocked when the receiver is tilted forwardly, and the door of the compartment will be unlocked when the receiver is tilted rearwardly, and means adapted to automatically close said door when no weight is resting upon them, and weights adjustable upon the upper frame between its pivotal support and its extremity opposite to that receiving the pivotal connection.

2. In an automatic weighing scale, the combination of two frames approximately horizontal one above the other and pivoted at opposite ends, a swinging connection between the free end of one frame and the pivoted end of the other, an oscillatory receiver pivotally mounted upon the former frame, its pivotal axis being parallel to the pivotal axes of the two frames, and nearer to the rear wall than to the front one of the receiver, said receiver being provided with a compartment in its upper portion adjacent to the rear wall, a swinging door in the bottom of the receiver, a swinging door in the bottom of said compartment, a separate locking means for each of said doors, adapted to be automatically released, one when the receiver is in its forward position, and the other when in its rear position, means adapted to automatically close said doors when there is no weight resting upon the same, and weights adjustable upon the upper frame between its pivotal support and its extremity opposite to that receiving the pivotal connection.

3. In an automatic weighing scale, the combination of a frame adapted to undergo a slight downward displacement, an oscillatory receiver centrally pivoted upon said frame, an auxiliary compartment being provided in the upper rear portion of said receiver, a door in the bottom of said receiver, a door in the bottom of said compartment, means locking the receiver door, adapted to be automatically released when the receiver is tilted forwardly, means locking the door of the compartment, adapted to be automatically released when the receiver is tilted rearwardly, a weight counterbalancing each door and adapted to close the same, and a weight adapted to counter-balance the frame which supports the receiver.

4. In an automatic weighing scale, the combination of a frame adapted to undergo a slight downward displacement, an oscillatory receiver centrally pivoted upon said frame, an auxiliary compartment being provided in the upper rear portion of said receiver, a door in the bottom of said receiver, a door in the bottom of said compartment, means locking the receiver door, adapted to be automatically released when the receiver is tilted forwardly, means locking the door of the compartment adapted to be automatically released when the receiver is tilted rearwardly, means adapted to automatically close the receiver door when the receiver has been emptied, means for locking the receiver in its rear and front positions, and a weight adapted to counter balance said frame and the receiver which it supports.

5. In an automatic weighing scale, the combination of a frame pivotally supported at one end, and adapted to undergo a limited angular displacement about its pivotal support, an oscillatory receiver centrally pivoted upon said frame, its pivotal axis being parallel to that of the frame and disposed rearwardly of the center of the receiver, said receiver being provided with a compartment in its upper rear portion, a swinging door in the bottom of said compartment, a swinging door in the bottom of the receiver, a separate locking means for each of said doors, such that the receiver door will be unlocked when the receiver is tilted forwardly, and the door of the compartment will be unlocked when the receiver is tilted rearwardly, means adapted to automatically close said doors when no weight is resting upon them, a beam pivotally mounted above said frame, a swinging connection attaching the free end of the frame to the beam at one side of its pivotal support, and a weight adjustable upon the beam at the other side of its pivotal support.

6. In an automatic weighing scale, the combination of a frame adapted to undergo a slight downward displacement, an oscillatory receiver centrally pivoted upon said frame, an auxiliary compartment being provided in the upper rear portion of the receiver, a door in the bottom of said receiver, a door in the bottom of said compartment, means locking the receiver door adapted to be automatically released when the receiver is tilted forwardly, means locking the door of the compartment, adapted to be automatically released when the receiver is tilted rearwardly, separate means for locking the receiver in its rearward and forward positions, a chute mounted above the receiver, and means adapted to partially close the passage of said chute, entering the chute when the same is downwardly displaced and removed therefrom when the receiver oscillates forwardly.

7. In an automatic weighing scale, the combination of a frame pivotally supported at one extremity and adapted to undergo a limited angular displacement about its pivotal support, an oscillatory receiver centrally pivoted upon said frame, its pivotal axis being to the rear of the center of said receiver, a beam pivotally mounted above said frame, a swinging connection attaching the free end of the frame to one side of its pivotal support, a weight adjustable upon the beam at the other side of its pivotal support, a door in the bottom of the receiver, a means for locking said door, adapted to be automatically released when the receiver oscillates to its forward position, and means for locking the receiver in place after its oscillation to either a forward or rearward position.

8. In an automatic weighing scale, the combination of a frame pivotally supported at one extremity, and adapted to undergo a limited angular displacement about its pivotal support, an oscillatory receiver centrally mounted upon said frame, its pivotal axis being parallel to that of the frame, and a small compartment being provided in the upper rear portion of the receiver, a beam pivotally mounted above said frame, a swinging connection attaching the free end of the frame to the beam at one side of its pivotal support, and a weight adjustable upon the beam at the other side of its pivotal support, a swinging door to said compartment, a swinging door to said receiver, means for counterbalancing the weight of said doors, adapted to close the same when the receiver and compartment are emptied, means for locking said doors, adapted to be automatically released when the receiver swings to the side to which each door is adjacent, means for locking the receiver in its forward and rearward positions respectively, a chute positioned above the receiver, means for partially closing said chute, a closure being formed by said means when the receiver is downwardly displaced, and the closure being removed when the receiver undergoes a forward oscillation.

9. In an automatic weighing scale, the combination of two frames approximately horizontal one above the other, and pivoted at opposite ends, a swinging connection between the free end of one frame and the pivoted end of the other, an oscillatory receiver pivotally mounted upon the former frame, its pivotal axis being parallel to the pivotal axes of the two frames, and having an auxiliary compartment in its upper rear portion, a door in the bottom of said receiver, a door in the bottom of said compartment, separate means for counter-balancing the weights of said doors, separate means for locking said doors, adapted to be released when the receiver oscillates to the side adjacent to said doors, separate means for locking the receiver in its forward and rearward positions, and weights upon the last named of the two frames adjustable between its pivotal support and its extremity opposite to that receiving the pivotal connection.

In testimony whereof I have signed my name to this specification in the presence of two subscribing witnesses.

EDWARD D. CARTER.

Witnesses:
L. Morris,
R. Bruckner.